United States Patent [19]
Lundgard et al.

[11] Patent Number: 5,844,037
[45] Date of Patent: *Dec. 1, 1998

[54] THERMOPLASTIC POLYMER COMPOSITIONS WITH MODIFIED ELECTRICAL CONDUCTIVITY

[75] Inventors: Richard A. Lundgard; Susan J. Babinec; Robert D. Mussell; Ashish Sen, all of Midland, Mich.

[73] Assignee: The Dow Chemical Company, Midland, Mich.

[*] Notice: This patent issued on a continued prosecution application filed under 37 CFR 1.53(d), and is subject to the twenty year patent term provisions of 35 U.S.C. 154(a)(2).

[21] Appl. No.: 686,634

[22] Filed: Jul. 24, 1996

[51] Int. Cl.⁶ .............................. C08K 3/04; C08L 23/04; H01B 1/06
[52] U.S. Cl. ......................... 524/496; 524/495; 524/505; 524/515; 524/901; 252/511; 523/221; 523/351; 523/220; 525/240
[58] Field of Search ............................ 252/511; 524/495, 524/496, 901, 505, 515; 525/240, 237; 523/220, 221, 351

[56] References Cited

U.S. PATENT DOCUMENTS

| | | | |
|---|---|---|---|
| 3,963,647 | 6/1976 | Straub | 252/511 |
| 4,041,103 | 8/1977 | Davison et al. | 525/940 |
| 4,132,698 | 1/1979 | Gessler et al. | 524/518 |
| 4,170,664 | 10/1979 | Spenadel et al. | 252/511 |
| 4,265,789 | 5/1981 | Christopherson et al. | 252/511 |
| 4,369,267 | 1/1983 | Keung et al. | 524/496 |
| 4,395,362 | 7/1983 | Satoh et al. | 252/511 |
| 4,592,941 | 6/1986 | Emmons | 428/113 |
| 4,731,199 | 3/1988 | Matsuo et al. | 252/511 |
| 4,734,450 | 3/1988 | Kawai et al. | 524/413 |
| 4,929,388 | 5/1990 | Wessling | 252/511 |
| 5,116,540 | 5/1992 | Chundury et al. | 252/511 |
| 5,143,650 | 9/1992 | Gerace et al. | 252/511 |
| 5,206,294 | 4/1993 | Dawson | 525/196 |
| 5,223,106 | 6/1993 | Gerace et al. | 252/511 |
| 5,256,574 | 10/1993 | Neuburger et al. | 252/511 |
| 5,272,236 | 12/1993 | Lai et al. | 526/348.5 |
| 5,278,272 | 1/1994 | Lai et al. | 526/348.5 |
| 5,371,134 | 12/1994 | Inoue | 524/495 |
| 5,484,838 | 1/1996 | Helms et al. | 524/496 |

FOREIGN PATENT DOCUMENTS

| | | |
|---|---|---|
| 0 351 660 A2 | 1/1990 | European Pat. Off. . |
| 0 718 350 A1 | 6/1996 | European Pat. Off. . |
| 0 733 667 A1 | 9/1996 | European Pat. Off. . |
| 36 08 661 A1 | 12/1996 | Germany . |
| 1060497 | 3/1967 | United Kingdom . |
| WO 94/06859 | 3/1994 | WIPO ............................ C08L 23/04 |
| WO 94/07612 | 4/1994 | WIPO ............................ B05D 1/04 |

OTHER PUBLICATIONS

Jachym, Bronislaw J., "Conduction in Carbon Black–Doped Polymers", Carbon Black–Polymer Composites, pp. 103–111 (1982).
Derwent 74–42418V, JP 48096634 (Dec. 10, 1973).
Derwent 84–060919, SU 1014843 (Apr. 30, 1983).
Derwent 86–263888, SU 1213037 (Feb. 23, 1986).
Derwent 95–085536, JP 07011048 (Jan. 13, 1995).
Patent Abstracts of Japan, vol. 097, No. 002 (Feb. 28, 1997) (JP 08283421—Oct. 29, 1996).

*Primary Examiner*—James J. Seidleck
*Assistant Examiner*—Olga Asinovsky

[57] ABSTRACT

A process for preparing an electronically-conductive thermoplastic composition having at least two phases, which includes (A) combining an amorphous or semi-crystalline thermoplastic polymer or miscible blend of polymers with an electronically-conductive carbon under conditions sufficient to disperse the conductive carbon, thereby forming a mixture having at least one phase, with at least 60 percent of the carbon dispersed in a first phase which comprises at least 90 percent by weight of the mixture; and (B) combining the mixture obtained from step (A) with an amorphous or semi-crystalline thermoplastic polymer or miscible blend of polymers, at least a portion of which is immiscible in the first phase, thereby forming a composition having at least two phases. Compositions prepared by this process are sufficiently conductive to be useful for a variety of applications, such as structural materials for applications requiring electromotively-paintable substrates.

43 Claims, No Drawings

THERMOPLASTIC POLYMER COMPOSITIONS WITH MODIFIED ELECTRICAL CONDUCTIVITY

BACKGROUND OF THE INVENTION

This invention relates to blends of thermoplastic polymers containing carbon black. More particularly, this invention relates to such blends which have a conductivity of at least $10^{-12}$ Siemens/cm (S/cm).

It is known to prepare coated articles by electrostatic painting methods. In such methods, a paint or coating is charged or ionized and sprayed on a grounded, conductive article, and the electrostatic attraction between the paint or coating and the grounded article results in a more efficient painting process with less wasted paint material, and thicker and more consistent paint coverage, particularly when the article has a complex shape. When articles fabricated from metals are painted, the metal, which is inherently conductive, is easily grounded and efficiently painted. In recent years, there has been an emphasis on the use of polymeric materials in the manufacture of articles, particularly in applications requiring reductions in weight and improved corrosion resistance, such as automotive applications. However, polymers typically used in such processes are insufficiently conductive to efficiently obtain a satisfactory paint thickness and coverage when the article is electrostatically painted.

Methods are known for the incorporation of conductive fillers into polymers in order to improve their conductivity for use in electrostatic coating applications. U.S. Pat. No. 5,484,838 discloses a polymer blend taught as useful in the preparation of electrostatically-paintable articles which comprises a crystalline polymer, an amorphous polymer, and electrically-conductive carbon black, wherein at least a portion of the carbon black is dispersed within the crystalline polymer. However, the conductivity of articles made therefrom, the amount of carbon black necessary to provide a composition with a particular conductivity, the processing requirements for the preparation of such compositions, as well as the physical, and/or surface appearance properties of electromotively-coated articles prepared therefrom, may be less than desirable for certain applications.

SUMMARY OF THE INVENTION

In one aspect, this invention is a process for preparing an electronically-conductive thermoplastic composition having at least two phases, which comprises (A) combining an amorphous or semi-crystalline thermoplastic polymer or miscible blend of polymers with an electronically-conductive carbon under conditions sufficient to disperse the conductive carbon, thereby forming a mixture having at least one phase, with at least 60 percent of the carbon dispersed in a first phase which comprises at least 90 percent by weight of the mixture; and (B) combining the mixture obtained from step (A) with an amorphous or semi-crystalline thermoplastic polymer or miscible blend of polymers, at least a portion of which is immiscible in the first phase, thereby forming a composition having at least two phases; wherein:

(i) the polymer(s) in the first phase comprise no more than 49 percent by weight of the polymers in the composition;

(ii) a second phase is more crystalline than the first phase or, if more than 51 percent by weight of the polymers in the composition are amorphous, the second phase has a higher glass transition temperature than the first phase; and (iii) the conductive carbon is present in an amount sufficient to provide a composition conductivity of at least $10^{-12}$ S/cm.

In a second aspect, this invention is a phase-separated mixture comprising:

(I) a first phase comprising an amorphous or semi-crystalline thermoplastic polymer or miscible blend of polymers;

(II) a second phase comprising an amorphous or semi-crystalline thermoplastic polymer or miscible blend of polymers different from (I); and (III) electronically-conductive carbon; wherein:

(i) component (III) is present in an amount (a) sufficient to provide a composition conductivity of at least $10^{-12}$ S/cm; and (b) in the range of from 0.1 to 12 percent by weight, based on the weight of the composition; and (ii) at least 60 percent of component (III) is dispersed in the least crystalline phase(s) or, if more than 51 percent of the polymers are amorphous, the phase(s) having the lowest glass transition temperatures, which phase(s) comprise no more than 49 percent by weight of the polymers in the composition.

In a third aspect, this invention is a phase-separated composition having at least two phases comprising:

(I) a first phase comprising an amorphous or semi-crystalline thermoplastic polymer or miscible blend of polymers;

(II) a second phase comprising an amorphous or semi-crystalline thermoplastic polymer or miscible blend of polymers different from (I); and (III) electronically-conductive carbon; wherein:

(i) component (III) is present in an amount sufficient to provide a composition conductivity of at least $10^{-12}$ S/cm; and (ii) at least 60 percent of component (III) is dispersed in the least crystalline phase(s) or, if more than 51 percent of the polymers are amorphous, at least one of the phase(s) having the lowest glass transition temperatures, which phase(s)

(a) comprise no more than 49 percent by weight of the polymers in the composition and (b) contain at least one copolymer of ethylene and at least one α-olefin, prepared using a constrained geometry catalyst.

It has been discovered that the compositions prepared by the process of the invention, as well as the compositions of the invention, are sufficiently conductive to be useful for a variety of applications, such as structural materials for applications requiring electromotively-paintable substrates, or static-dissipation or EMI shielding applications. Such compositions may require a relatively low amount of conductive carbon to achieve a particular conductivity, may have processing advantages, and the physical and/or surface appearance properties of electromotively-coated articles prepared therefrom may be relatively advantageous. It is believed, without intending to be bound, that the addition of the majority of the conductive carbon to a relatively minor phase of the phase-separate composition results in a relatively high concentration of the conductive carbon in that phase, which provides a higher conductivity than addition to the major phase or uniform dispersion of the conductive carbon throughout the composition. These and other advantages of the invention will be apparent from the description which follows.

DETAILED DESCRIPTION

The term "phase separate" as used herein means that the composition contains two or more polymer-containing phases which are observable by transmission electron microscopy at a magnification of 30,000×. The term "phase" as used herein does not include materials present in the composition which are not polymers, such as the conductive carbon or fillers. The presence of two phases may be determined by differential scanning calorimetry (DSC) analysis, showing more than one local maximum in the measured heat absorption of the composition (a glass transition temperature or melt temperatures for one of the phases). Conversely, the term "miscible" as used herein refers to a mixture of polymers which shows only one such local maximum in the measured heat absorption.

Preferably, the composition contains only two phases, in which case the minor phase contains at least 60 percent of the conductive carbon present, and the polymer(s) of the minor phase is less crystalline or, if both phases are amorphous, has a lower glass transition temperature than the polymer(s) of the major phase. Preferably, the major phase is a polymer having a crystallinity of greater than 30 percent and the minor phase is a polymer having a crystallinity of less than 20 percent. If three or more phases are present, at least 60 percent of the carbon is dispersed within the phase(s) having the lowest crystallinity (or if more than 49 percent of the polymers in the composition are amorphous, the phases having the lowest glass transition temperature), so long as such phases contain no more than 49 percent by weight of the polymers in the composition. For example, in a three-phase composition wherein each phase has a different crystallinity, if the two least crystalline phases each comprise 30 percent by weight of the polymers present in the composition and the most crystalline third phase comprises the remaining 40 percent by weight of the composition, at least 60 percent of the carbon present in the composition must be dispersed in the least crystalline phase of the three. However, if the two least crystalline phases each comprise 20 percent and 29 percent, respectively, of the composition, since their combined weight is no more than 49 percent of the polymers in the composition, at least 60 percent of the carbon present in the composition may be present in either of the two least crystalline phases, or may be apportioned between the two.

Examples of thermoplastic polymers suitable for use in the invention include thermoplastic polyurethanes (e.g., PELLETHANE™ or ISOPLAST™ made by The Dow Chemical Company), polyvinyl chlorides (PVCs), styrenics, polyolefins (including, e.g., ethylene carbon monoxide copolymers (ECO) or linear alternating ECO copolymers described in PCT Publication WO 96/01690, the disclosure of which is incorporated herein by reference), copolymers of ethylene and at least one α-olefin prepared using a constrained geometry catalyst, ethylene/propylene carbon monoxide polymers (EPCO)), polycarbonates, thermoplastic polyesters, polyamides (e.g., nylon), polyacetals, polysulfones, or mixtures thereof. Preferably, the most crystalline component is high density polyethylene homopolymer, a linear low density copolymer of ethylene and at least one α-olefin monomer, or polypropylene, and is most preferably polypropylene.

Examples of polypropylene include the isotactic, syndiotactic, and atactic forms of polypropylene homopolymer, as well as polypropylene impact copolymers (e.g., those wherein a secondary copolymerization step reacting ethylene with the propylene is employed, and random copolymers (also reactor modified and usually containing 1.5 to 7 percent ethylene copolymerized with the propylene), and mixtures thereof. Examples of such are described in *Modern Plastics Encyclopedia*/89, mid October 1988 Issue, Vol. 65, No. 11, pp. 86–92, the entire disclosure of which is incorporated herein by reference. Most preferably, the most crystalline polymer in the composition is isotactic polypropylene. The molecular weight of the polypropylene may be measured using a melt flow measurement according to ASTM D-1238, Condition 230 C/2.16 kg (formerly known as "Condition (L)" and also known as $I_2$). The melt flow rate of the most crystalline polymer is preferably in the range of from about 0.1 grams/10 minutes (g/10 min) to about 75 g/10 min, preferably from about 0.5 g/10 min to about 60 g/10 min, especially from about 1 g/10 min to about 50 g/10 min, and most especially from about 5 g/10 min to about 45 g/10 min.

Other polymers which are useful as a component having a relatively low degree of crystallinity include polyisoprene rubbers, ethylene-propylene copolymers, ethylene-propylene diene rubbers (EPDM), chlorinated rubbers, nitrile rubbers, polystyrene, styrene, acrylonitrile copolymers, polyphenylene oxides, methylmethacrylate styrene-butadiene block copolymers, polyether sulfones, polysulfones, polyarylates, polybutadiene, and acrylonitrile-butadiene-styrene copolymers.

If all of the thermoplastic polymer components are amorphous polymers, the Tg of the polymer having the highest Tg is preferably at least about 60° C., more preferably at least about 70° C.; but is preferably no greater than 200° C., more preferably no greater than 180° C., as may be determined by differential scanning calorimetry (DSC). The Tg of the polymer having the lowest Tg is preferably at least about −140° C., more preferably at least about −80° C.; but is preferably no greater than 25° C., more preferably no greater than 0° C. If at least one of the components is a semi-crystalline polymer, its melting temperature is preferably at least 60° C., more preferably at least 85° C.; but is preferably no greater than 340° C., more preferably no greater than 270° C. If the component having the lower degree of crystallinity is semi-crystalline, its melting temperature is preferably at least −20° C., more preferably at least 0° C.; but is preferably no greater than 80° C., more preferably no greater than 60° C. The degree of crystallinity of the more crystalline component is preferably at least about 30 percent, more preferably at least about 40 percent; but is preferably no greater than 80 percent, more preferably no greater than 70 percent. The degree of crystallinity of the less crystalline component is preferably no greater than 30 percent, and is more preferably no greater than 20 percent, as may be determined by differential scanning calorimetry (DSC) analysis, as described in "Crystallinity Determination", *Encyclopedia of Polymer Science and Engineering,* Vol. 4, p. 482 (1986).

If more than two thermoplastic polymers are used in the preparation of the compositions of the invention, at least two of such components should have different degrees of crystallinity (or different glass transition temperatures, if all of the components are amorphous). Less than 40 percent of the conductive carbon present in the composition should reside in the most crystalline thermoplastic polymer (or amorphous polymer having the highest glass transition temperature, if all components are amorphous).

The least crystalline component is preferably employed in an amount sufficient to provide a continuous phase thereof in the composition of the invention, although more than one polymer present in the composition may form co-continuous phases. The presence of a continuous phase may be inferred by transmission electron microscopy (which shows the presence of the conductive carbon in the component), in combination with the relative conductivity of the composition. A relatively high conductivity indicates that the conductive carbon-filled component is present in an amount above the percolation threshold for the composition, which also indicates that the particles of thermoplastic material are connected to each other, providing a continuous phase thereof. Although the particular amount of the least crystalline component necessary to provide a continuous phase thereof will depend on the particular combination of polymers, conductive carbon, fillers in the composition, and the process by which they are combined, the least crystalline component is preferably present in an amount, based on the weight of the polymers in the composition, of at least 15 percent.

The homogeneous linear or substantially linear ethylene/α-olefin interpolymer useful in the process and compositions of the invention is prepared using a constrained geometry catalyst. By the term "homogenous", it is meant that any comonomer is randomly distributed within a given interpolymer molecule and substantially all of the interpolymer molecules have the same ethylene/comonomer ratio within that interpolymer.

The homogeneous linear and substantially linear interpolymers are characterized as having a narrow molecular weight distribution ($M_w/M_n$). For the linear and substantially linear interpolymers, the $M_w/M_n$ is from 1.5 to 2.5, preferably from 1.8 to 2.2.

Substantially linear ethylene interpolymers may be further characterized as having long-chain branching. Due to the presence of such long chain branching, substantially linear ethylene interpolymers have a melt flow ratio ($I_{10}/I_2$) which may be varied independently of the polydispersity index, i.e., the molecular weight distribution $M_w/M_n$. This feature accords substantially linear ethylene polymers with a high degree of processability despite a narrow molecular weight distribution.

The long chain branches of substantially linear ethylene interpolymers have the same comonomer distribution as the interpolymer backbone and can be as long as about the same length as the length of the interpolymer backbone. Such interpolymers may be characterized as having a backbone substituted with from 0.01 to 3 long chain branches per 1000 carbons.

Methods for determining the amount of long chain branching present, both qualitatively and quantitatively, are known in the art.

For qualitative methods for determining the presence of long chain branching, see, e.g., U.S. Pat. Nos. 5,272,236 and 5,278,272, the disclosures of both of which are incorporated herein by reference. As set forth therein, a gas extrusion rheometer (GER) may be used to determine the rheological processing index (PI), the critical shear rate at the onset of surface melt fracture, and the critical shear stress at the onset of gross melt fracture, which in turn indicate the presence or absence of long chain branching as set forth below.

The GER useful in the determination of PI, the critical shear rate at the onset of surface melt fracture, and the critical shear stress at the onset of gross melt fracture, is described by M. Shida et al. in *Polymer Engineering Science*, Vol. 17, No. 11, p. 770 (1977), and in "Rheometers for Molten Plastics" by John Dealy, published by Van Nostrand Reinhold Co. (1982) on pp. 97–99, both of which are incorporated herein by reference in their entirety. GER experiments are performed at a temperature of 190° C., at nitrogen pressures between 250 and 5500 psig using a 0.0754 mm diameter, and 20:1 L/D die with an entrance angle of 180°.

For substantially linear ethylene interpolymers, the PI is the apparent viscosity (in kpoise) of a material measured by GER at an apparent shear stress of $2.15 \times 10^6$ dynes/cm². Substantially linear ethylene interpolymers useful in the invention will have a PI in the range of 0.01 kpoise to 50 kpoise, preferably 15 kpoise or less. Substantially linear ethylene interpolymers have a PI which is less than or equal to 70 percent of the PI of a linear ethylene interpolymer (either a Ziegler polymerized polymer or a homogeneous linear ethylene interpolymer) having the same comonomer or comonomers, and having an $I_2$, $M_w/M_n$, and density, each of which is within 10 percent of that of the substantially linear ethylene interpolymer.

An apparent shear stress versus apparent shear rate plot may be used to identify the melt fracture phenomena and to quantify the critical shear rate and critical shear stress of ethylene polymers. According to Ramamurthy, in the *Journal of Rheology*, 30(2), pp. 337–357 (1986), the disclosure of which is incorporated herein by reference, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." Herein, as determined using the above-described GER, the onset of surface melt fracture is characterized as the beginning of losing extrudate gloss at which the surface roughness of the extrudate can only be detected by 40× magnification. The critical shear rate at the onset of surface melt fracture for a substantially linear ethylene interpolymer is at least 50 percent greater than the critical shear rate at the onset of surface melt fracture for a linear ethylene polymer having the same comonomer or comonomers and having an $I_2$, $M_w/M_n$ and density within 10 percent of that of the substantially linear ethylene polymer.

Gross melt fracture occurs at unsteady extrusion flow conditions and ranges from regular (alternating rough and smooth, helical, etc.) to random distortions. The critical shear stress at the onset of gross melt fracture of substantially linear ethylene interpolymers, especially those having a density greater than 0.910 g/cm³, is greater than $4 \times 10^6$ dynes/cm².

The presence of long chain branching may further be qualitatively determined by the Dow Rheology Index (DRI), which expresses a polymer's "normalized relaxation time as the result of long chain branching". (See, S. Lai and G. W. Knight, ANTEC '93 Proceedings, INSITE™ Technology Polyolefins (SLEP)-New Rules in the Structure/Rheology Relationship of *Ethylene α-Olefin Copolymers*, New Orleans, La., May 1993, the disclosure of which is incorporated herein by reference). DRI values range from 0 for polymers which do not have any measurable long chain branching, such as TAFMER™ products available from Mitsui Petrochemical Industries and EXACT™ products available from Exxon Chemical Company) to about 15, and are independent of melt index. In general, for low to medium pressure ethylene polymers, particularly at lower densities, DRI provides improved correlations to melt elasticity and high shear flowability relative to correlations of the same attempted with melt flow ratios. Substantially linear ethylene interpolymers will have a DRI of preferably at least 0.1, more preferably at least 0.5, and most preferably at least 0.8.

DRI may be calculated from the equation:

$$DRI = (3652879 * \tau_0^{1.00649}/\eta_0 - 1)/10$$

where $\tau_0$ is the characteristic relaxation time of the interpolymer and $\eta_0$ is the zero shear viscosity of the interpolymer. Both $\tau_0$ and $\eta_0$ are the "best fit" values to the Cross equation, i.e., $$\eta/\eta_0 = 1/(1 + (\gamma * \tau_0)^{1-n})$$

in which n is the power law index of the material, and $\eta$ and $\gamma$ are the measured viscosity and shear rate, respectively. Baseline determination of viscosity and shear rate data are obtained using a Rheometric Mechanical Spectrometer (RMS-800) under dynamic sweep mode from 0.1 to 100 radians/second at 160° C. and a GER at extrusion pressures from 1,000 to 5,000 psi (6.89 to 34.5 MPa), which corresponds to a shear stress of from 0.086 to 0.43 MPa, using a 0.0754 mm diameter, and 20:1 L/D die at 190° C. Specific material determinations may be performed from 140° to 190° C. as required to accommodate melt index variations.

For quantitative methods for determining the presence of long chain branching, see, e.g., U.S. Pat. Nos. 5,272,236 and 5,278,272; Randall (*Rev. Macromol. Chem. Phys.*, C29 (2&3), pp. 285–297), which discusses the measurement of long chain branching using 13C nuclear magnetic resonance spectroscopy, Zimm, G. H. and Stockmayer, W. H., *J. Chem. Phys.*, Vol. 17, p. 1301 (1949); and Rudin, A., *Modern Methods of Polymer Characterization*, John Wiley & Sons, New York, pp. 103–112 (1991), which discuss the use of gel permeation chromatography coupled with a low angle laser light scattering detector (GPC-LALLS) and gel permeation chromatography coupled with a differential viscometer detector (GPC-DV). Each of the these references is incorporated herein by reference.

Comonomers useful in the preparation of the interpolymer of ethylene with at least one comonomer are [selected from the group consisting of] $C_3$–$C_{20}$ α-olefins, tetrafluoroethylene, vinylbenzocyclobutane, non-conjugated dienes, and cycloalkenes. Exemplary $C_3$–$C_{20}$ α-olefins include propylene, isobutylene, 1-butene, 1-hexene, 4-methyl-1-pentene, 1-heptene, and 1-octene. Preferred $C_3$–$C_{20}$ α-olefins include 1-butene, 1-hexene, 4-methyl-1-pentene, 1-heptene, and 1-octene, more preferably 1-hexene and 1-octene. Exemplary cycloalkenes include cyclopentene, cyclohexene, and cyclooctene.

The non-conjugated dienes suitable as comonomers, particularly in the making of ethylene/α-olefin/diene terpolymers, are typically non-conjugated dienes having from 6 to 15 carbon atoms. Representative examples of suitable non-conjugated dienes include: (a) straight-chain acyclic dienes such as 1,4-hexadiene; 1,5-heptadiene; and 1,6-octadiene; (b) branched-chain acyclic dienes such as 5-methyl-1,4-hexadiene; 3,7-dimethyl-1,6-octadiene; and 3,7-dimethyl-1,7-octadiene; (c) single-ring alicyclic dienes such as 4-vinylcyclohexene; 1-allyl-4-isopropylidene cyclohexane; 3-allylcyclopentene; 4-allylcyclohexene; and 1-isopropenyl-4-butenylcyclohexene; and (d) multi-ring alicyclic fused and bridged-ring dienes such as dicyclopentadiene; alkenyl, alkylidene, cycloalkenyl, and cycloalkylidene norbornenes, such as 5-methylene-2-norbornene; 5-methylene-6-methyl-2-norbornene; 5-methylene-6,6-dimethyl-2-norbornene; 5-propenyl-2-norbornene; 5-(3-cyclopentenyl)-2-norbornene; 5-ethylidene-2-norbornene; and 5-cyclohexylidene-2-norbornene.

The preferred dienes are selected from the group consisting of 1,4-hexadiene; dicyclopentadiene; 5-ethylidene-2-norbornene; 5-methylene-2-norbornene; 7-methyl-1,6 octadiene; piperylene; and 4-vinylcyclohexene.

The ethylene/α-olefin interpolymer will have a density of from 0.850 to 0.965 g/cm$^3$, preferably from 0.850 to 0.900 g/cm$^3$, and most preferably from 0.870 to 0.890 g/cm$^3$. When the ethylene/α-olefin interpolymer has a density of from 0.885 to 0.895 g/cm$^3$, both the toughness and the elongation are maximized.

Homogeneously-branched linear ethylene/α-olefin interpolymers may be prepared using polymerization processes (e.g., as described by Elston in U.S. Pat. No. 3,645,992, the disclosure of which is incorporated herein by reference) which provide a homogeneous short chain branching distribution. Such polymers have a homogeneity index of at least 75 as determined by the following equation:

$$HI = 100 \frac{130 - 7.42(CH_3) + 0.414(CH_3)^2 - MP_{TC}}{11.09CH_3 - 0.553(CH_3)^2}$$

wherein HI equals homogeneity index, $CH_3$=Total $CH_3$/100C+vinyl/100C, and $MP_{TC}$=melting point of the copolymer, °C. In his polymerization process, Elston uses soluble vanadium catalyst systems to make such polymers. However, others such as Mitsui Petrochemical Company and Exxon Chemical Company have used so-called single-site catalyst systems to make polymers having a homogeneous linear structure. U.S. Pat. No. 4,937,299 to Ewen et al. and U.S. Pat. No. 5,218,071, to Tsutsui et al. disclose the use of metallocene catalysts, such as catalyst systems based on hafnium, for the preparation of homogeneous linear ethylene polymers. Homogeneous linear ethylene/α-olefin interpolymers are currently available from Mitsui Petrochemical Company under the tradename "Tafmer" and from Exxon Chemical Company under the tradename "Exact".

Substantially linear ethylene/α-olefin interpolymers are available from The Dow Chemical Company as AFFINITY™ polyolefin plastomers and ENGAGE™ polyolefin elastomers. Substantially linear ethylene/α-olefin interpolymers may be prepared in accordance with the techniques described in U.S. Pat. Nos. 5,272,236 and 5,278,272, incorporated herein by reference.

The term "constrained geometry catalyst" as used herein refers to metal complexes described in U.S. application Ser. No. 545,403, filed Jul. 3, 1990 (EP-A-416,815); U.S. application Ser. No. 702,475, filed May 20, 1991 (EP-A-514,828); U.S. Pat. Nos. 5,470,993; 5,374,696; 5,231,106; 5,055,438; 5,057,475; 5,096,867; 5,064,802; 5,132,380; 5,453,410; and U.S. Ser. No. 720,041, filed Jun. 24, 1991, (EP-A-514,828, all of which are hereby incorporated herein by reference. In the preparation of the polymer, cocatalysts may be employed if desired.

Examples of constrained geometry metal complexes in which titanium is present in the +4 oxidation state include but are not limited to the following: (n-butylamido)dimethyl ($\eta^5$-tetramethylcyclopentadienyl)silanetitanium (IV) dimethyl; (n-butylamido)dimethyl($\eta^5$-tetramethylcyclopentadienyl)silanetitanium (IV) dibenzyl; (t-butylamido)dimethyl($\eta^5$-tetramethylcyclopentadienyl) silanetitanium (IV) dimethyl; (t-butylamido)dimethyl($\eta^5$-tetramethylcyclopentadienyl)silane-titanium (IV) dibenzyl; (cyclododecylamido)dimethyl($\eta^5$-tetramethylcyclopentadienyl)silanetitanium (IV) dibenzyl; (2,4,6-trimethylanilido)dimethyl-($\eta^5$-tetramethylcyclopentadienyl)silanetitanium (IV) dibenzyl; (1-adamantyl-amido)dimethyl ($\eta^5$-tetramethylcyclopentadienyl)silanetitanium (IV) dibenzyl; (t-butylamido)dimethyl($\eta^5$-tetramethylcyclopentadienyl)

silanetitanium (IV) dimethyl; (t-butylamido)dimethyl($\eta^5$-tetramethylcyclopentadienyl)silanetitanium (IV) dibenzyl; (1-adamantylamido)dimethyl($\eta^5$-tetramethylcyclopentadienyl)-silanetitanium (IV) dimethyl; (n-butylamido)diisopropoxy($\eta^5$-tetramethylcyclopentadienyl)silanetitanium (IV) dimethyl; (n-butylamido)diisopropoxy($\eta^5$-tetramethylcyclopentadienyl)silanetitanium (IV) dibenzyl; (cyclododecylamido)diisopropoxy($\eta^5$-tetramethylcyclopentadienyl)-silanetitanium (IV) dimethyl; (cyclododecylamido)diisopropoxy($\eta^5$-tetramethylcyclopentadienyl)-silanetitanium (IV) dibenzyl; (2,4,6-trimethylanilido)diisopropoxy($\eta^5$-tetramethylcyclopentadienyl)-silanetitanium (IV) dimethyl; (2,4,6-trimethylanilido)diisopropoxy($\eta^5$-tetramethylcyclopentadienyl)silanetitanium (IV) dibenzyl; (cyclododecylamido)dimethoxy($\eta^5$-tetramethylcyclopentadienyl)silanetitanium (IV) dimethyl; (cyclododecylamido)-dimethoxy ($\eta^5$-tetramethylcyclopentadienyl)silanetitanium (IV) dibenzyl; (1-adamantylamido)diisopropoxy($\eta^5$-tetramethylcyclopentadienyl)silanetitanium (IV) dimethyl; (1-adamantylamido)diisopropoxy($\eta^5$-tetramethylcyclopentadienyl)-silanetitanium (IV) dibenzyl; (n-butylamido)dimethoxy($\eta^5$-tetramethylcyclopentadienyl)silanetitanium (IV) dimethyl; (n-butylamido)dimethoxy-($\eta^5$-tetramethylcyclopentadienyl)silanetitanium (IV) dibenzyl; (2,4,6-trimethylanilido)dimethoxy($\eta^5$-tetramethylcyclopentadienyl)silanetitanium (IV) dimethyl; (2,4,6-trimethylanilido)dimethoxy($\eta^5$-tetramethylcyclopentadienyl)silanetitanium (IV) dibenzyl; (1-adamantylamido)dimethoxy($\eta^5$-tetramethylcyclopentadienyl)silanetitanium (IV) dimethyl; (1-adamantylamido)dimethoxy($\eta^5$-tetramethylcyclopentadienyl)silanetitanium (IV) dibenzyl; (n-butylamido)-ethoxymethyl($\eta^5$-tetramethylcyclopentadienyl)silanetitanium (IV) dimethyl; (n-butylamido)ethoxymethyl($\eta^5$-tetramethylcyclopentadienyl)silanetitanium (IV) dibenzyl; (cyclododecylamido)ethoxymethyl ($\eta^5$-tetramethylcyclopentadienyl)-silanetitanium (IV) dimethyl; (cyclododecylamido)ethoxymethyl($\eta^5$-tetramethylcyclopentadienyl)silanetitanium (IV) dibenzyl; (2,4,6-trimethylanilido)ethoxymethyl-($\eta^5$-tetramethylcyclopentadienyl)silanetitanium (IV) dimethyl; (2,4,6-trimethylanilido)ethoxymethyl($\eta^5$-tetraethylcyclopentadienyl)silanetitanium (IV) dibenzyl; (cyclododecylamido)dimethyl($\eta^5$-tetramethylcyclopentadienyl)silane-titanium (IV) dimethyl; (1-adamantylamido)-ethoxymethyl($\eta^5$-tetramethylcyclopentadienyl)silanetitanium (IV) dimethyl; and (1-adamantylamido)ethoxymethyl($\eta^5$-tetramethylcyclopentadienyl)silanetitanium (IV) dibenzyl.

Exemplary constrained geometry metal complexes in which titanium is present in the +3 oxidation state, include but are not limited to, the following: (n-butylamido)dimethyl($\eta^5$-tetramethylcyclopentadienyl)silanetitanium (III) 2-(N,N-dimethylamino)benzyl; (t-butylamido)dimethyl ($\eta^5$-tetramethylcyclopentadienyl)silanetitanium (III) 2-(N,N-dimethylamino)benzyl; (cyclododecylamido)dimethyl ($\eta^5$-tetramethylcyclopentadienyl)silanetitanium (III) 2-(N,N-dimethylamino)benzyl; (2,4,6-trimethylanilido)dimethyl ($\eta^5$-tetramethylcyclopentadienyl)silanetitanium (III) 2-(N,N-dimethylamino)benzyl; (1-adamantylamido)dimethyl($\eta^5$-tetramethylcyclopentadienyl)silanetitanium (III) 2-(N,N-dimethylamino)benzyl; (t-butylamido)dimethyl($\eta^5$-tetramethylcyclopentadienyl)silanetitanium (III) 2-(N,N-dimethylamino)benzyl; (n-butylamido)diisopropoxy($\eta^5$-tetramethylcyclopentadienyl)silanetitanium (III) 2-(N,N-dimethylamino)benzyl; (cyclododecylamido)diisopropoxy ($\eta^5$-tetramethylcyclopentadienyl)-silanetitanium (III) 2-(N,N-dimethylamino)benzyl; (2,4,6-trimethylanilido) diisopropoxy($\eta^5$-2-methylindenyl)silanetitanium (III) 2-(N,N-dimethylamino)benzyl; (1-adamantylamido)diisopropoxy($\eta^5$-tetramethylcyclopentadienyl)silanetitanium (III) 2-(N,N-dimethylamino)benzyl; (n-butylamido)dimethoxy($\eta^5$-tetramethylcyclopentadienyl)silanetitanium (III) 2-(N,N-dimethylamino)benzyl; (cyclododecylamido)dimethoxy($\eta^5$-tetramethylcyclopentadienyl)silanetitanium (III) 2-(N,N-dimethylamino)benzyl; (1-adamantylamido)dimethoxy($\eta^5$-tetramethylcyclopentadienyl)silanetitanium (III) 2-(N,N-dimethylamino)benzyl; (2,4,6-trimethylanilido)dimethoxy ($\eta^5$-tetramethylcyclopentadienyl)silanetitanium (III) 2-(N,N-dimethylamino)benzyl; (n-butylamido)ethoxymethyl($\eta^5$-tetramethylcyclopentadienyl)silanetitanium (III) 2-(N,N-dimethylamino)benzyl; (cyclododecylamido)ethoxymethyl ($\eta^5$-tetramethylcyclopentadienyl)silanetitanium (III) 2-(N,N-dimethylamino)benzyl; (2,4,6-trimethylanilido) ethoxymethyl($\eta^5$-tetramethylcyclopentadienyl) silanetitanium (III) 2-(N,N-dimethylamino)benzyl; and (1-adamantylamido)ethoxymethyl($\eta^5$-tetramethylcyclopentadienyl)silanetitanium (III) 2-(N,N-dimethylamino)benzyl.

Exemplary constrained geometry metal complexes in which titanium is present in the +2 oxidation state include, but are not limited to, the following: (n-butylamido)-dimethyl-($\eta^5$-tetramethylcyclopentadienyl)silanetitanium (II) 1,4-diphenyl-1,3-butadiene; (n-butylamido)dimethyl ($\eta^5$-tetramethylcyclopentadienyl)silanetitanium (II) 1,3-pentadiene; (t-butylamido)dimethyl($\eta^5$-tetramethylcyclopentadienyl)silane-titanium (II) 1,4-diphenyl-1,3-butadiene; (t-butylamido)dimethyl($\eta^5$-tetramethyl-cyclopentadienyl)silanetitanium (II) 1,3-pentadiene; (cyclododecylamido)dimethyl-($\eta^5$-tetramethylcyclopentadienyl)silanetitanium (II) 1,4-diphenyl-1,3-butadiene; (cyclododecylamido)dimethyl($\eta^5$-tetramethylcyclopentadienyl)silanetitanium (II) 1,3-pentadiene; (2,4,6-trimethylanilido)dimethyl($\eta^5$-tetramethylcyclopentadienyl)-silanetitanium (II) 1,4-diphenyl-1,3-butadiene; (2,4,6-trimethylanilido)dimethyl ($\eta^5$-tetramethylcyclopentadienyl)silanetitanium (II) 1,3-pentadiene; (2,4,6-trimethylanilido)dimethyl($\eta^5$-tetramethylcyclopentadienyl)silanetitanium (IV) dimethyl; (1-adamantylamido)dimethyl($\eta^5$-tetramethylcyclopentadienyl)silane-titanium (II) 1,4-diphenyl-1,3-butadiene; (1-adamantylamido)dimethyl($\eta^5$-tetramethylcyclopentadienyl)silanetitanium (II) 1,3-pentadiene; (t-butylamido)-dimethyl($\eta^5$-tetramethylcyclopentadienyl)silanetitanium (II) 1,4-diphenyl-1,3-butadiene; (t-butylamido)dimethyl($\eta^5$-tetramethylcyclopentadienyl)silanetitanium (II) 1,3-pentadiene; (n-butylamido)diisopropoxy($\eta^5$-tetramethylcyclopentadienyl)-silanetitanium (II) 1,4-diphenyl-1,3-butadiene; (n-butylamido)diisopropoxy($\eta^5$-tetramethylcyclopentadienyl)silanetitanium (II) 1,3-pentadiene; (cyclododecylamido)-diisopropoxy($\eta^5$-tetramethylcyclopentadienyl)silanetitanium (II) 1,4-diphenyl-1,3-butadiene; (cyclododecylamido)diisopropoxy ($\eta^5$-tetramethylcyclopentadienyl)-silanetitanium (II) 1,3-pentadiene; (2,4,6-trimethylanilido)diisopropoxy($\eta^5$-2-methyl-indenyl)silanetitanium (II) 1,4-diphenyl-1,3-butadiene; (2,4,6-trimethylanilido)-diisopropoxy($\eta^5$-tetramethylcyclopentadienyl)silanetitanium (II) 1,3-pentadiene; (1-adamantylamido)diisopropoxy($\eta^5$- tetramethylcyclopentadienyl)silanetitanium (II) 1,4-diphenyl-1,3-butadiene; (1-adamantylamido)diisopropoxy ($\eta^5$-tetramethylcyclopentadienyl)silanetitanium (II) 1,3-pentadiene; (n-butylamido)dimethoxy($\eta^5$-tetramethylcyclopentadienyl)silanetitanium (II) 1,4-diphenyl-1,3-butadiene; (n-butylamido)dimethoxy($\eta^5$-tetramethylcyclopentadienyl)silanetitanium (II) 1,3-pentadiene; (cyclododecylamido)dimethoxy($\eta^5$-tetramethylcyclopentadienyl)-silanetitanium (II) 1,4-diphenyl-1,3-butadiene; (cyclododecylamido)dimethoxy ($\eta^5$-tetramethylcyclopentadienyl)silanetitanium (II) 1,3-pentadiene; (2,4,6-trimethylanilido)dimethoxy($\eta^5$-tetramethylcyclopentadienyl)silanetitanium (II) 1,4-diphenyl-1,3-butadiene; (2,4,6-trimethylanilido)dimethoxy ($\eta^5$-tetramethylcyclopentadienyl)silanetitanium (II) 1,3-pentadiene; (1-adamantylamido)dimethoxy($\eta^5$-tetramethylcyclopentadienyl)silanetitanium (II) 1,4-diphenyl-1,3-butadiene; (1-adamantylamido)dimethoxy($\eta^5$-tetramethylcyclopentadienyl)-silanetitanium (II) 1,3-pentadiene; (n-butylamido)ethoxymethyl($\eta^5$-tetramethylcyclopentadienyl)silanetitanium (II) 1,4-diphenyl-1,3-butadiene; (n-butylamido)ethoxymethyl($\eta^5$-tetramethylcyclopentadienyl)silanetitanium (II) 1,3-pentadiene; (cyclododecylamido)ethoxymethyl($\eta^5$-tetramethylcyclopentadienyl)silanetitanium (II) 1,4-diphenyl-1,3-butadiene; (cyclododecylamido)ethoxymethyl ($\eta^5$-tetramethylcyclopentadienyl)silanetitanium (II) 1,3-pentadiene; (2,4,6-trimethylanilido)ethoxymethyl($\eta^5$-tetramethylcyclopentadienyl)silanetitanium (II) 1,4-diphenyl-1,3-butadiene; (2,4,6-trimethylanilido) ethoxymethyl($\eta^5$-tetramethylcyclopentadienyl) silanetitanium (II) 1,3-pentadiene; (1 -adamantylamido) ethoxymethyl($\eta^5$-tetramethylcyclopentadienyl) silanetitanium (II) 1,4-diphenyl-1,3-butadiene; and (1-adamantylamido)ethoxymethyl($\eta^5$-tetramethylcyclopentadienyl)silanetitanium (II) 1,3-pentadiene.

In most polymerization reactions the molar ratio of catalyst:polymerizable compounds employed is from $10^{-12}$:1 to $10^{-1}$:1, more preferably from $10^{-9}$:1 to $10^{-5}$:1.

At all times, the individual ingredients, as well as the recovered catalyst components, must be protected from oxygen and moisture. Therefore, the catalyst components and catalysts must be prepared and recovered in an oxygen and moisture-free atmosphere. Preferably, therefore, the reactions are performed in the presence of a dry, inert gas such as, for example, nitrogen.

The polymerization may be carried out as a batchwise or a continuous polymerization process, with continuous polymerizations processes being required for the preparation of substantially linear polymers. In a continuous process, ethylene, comonomer, and optionally solvent and diene are continuously supplied to the reaction zone and polymer product continuously removed therefrom.

In general, the first polymer may be polymerized at conditions for Ziegler-Natta or Kaminsky-Sinn type polymerization reactions, that is, reactor pressures ranging from atmospheric to 3500 atmospheres. The reactor temperature should be greater than 80° C., typically from 100° C. to 250° C., and preferably from 100° C. to 150° C., with temperatures at the higher end of the range, i.e., temperatures greater than 100° C. favoring the formation of lower molecular weight polymers.

In conjunction with the reactor temperature, the hydrogen:ethylene molar ratio influences the molecular weight of the polymer, with greater hydrogen levels leading to lower molecular weight polymers. When the desired polymer has an $I_2$ of 1 g/10 min, the hydrogen:ethylene molar ratio will typically be 0:1. When the desired polymer has an $I_2$ of 1000 g/10 min, the hydrogen:ethylene molar ratio will typically be from 0.45:1 to 0.7:1. The upper limit of the hydrogen-:ethylene molar ratio is about 2.2 to 2.5:1.

Generally, the polymerization process is carried out with a differential pressure of ethylene of from about 10 to about 1000 psi (70 to 7000 kPa), most preferably from about 40 to about 60 psi (30 to 300 kPa). The polymerization is generally conducted at a temperature of from 80° C. to 250° C., preferably from 90° C. to 170° C., and most preferably from greater than 95° C. to 140° C.

Solution polymerization conditions utilize a solvent for the respective components of the reaction. Preferred solvents include mineral oils and the various hydrocarbons which are liquid at reaction temperatures. Illustrative examples of useful solvents include alkanes such as pentane, iso-pentane, hexane, heptane, octane and nonane, as well as mixtures of alkanes including kerosene and ISOPAR-E™, available from Exxon Chemicals Inc.; cycloalkanes such as cyclopentane and cyclohexane; and aromatics such as benzene, toluene, xylenes, ethylbenzene and diethylbenzene.

The solvent will be present in an amount sufficient to prevent phase separation in the reactor. As the solvent functions to absorb heat, less solvent leads to a less adiabatic reactor. The solvent:ethylene ratio (weight basis) will typically be from 2.5:1 to 12:1, beyond which point catalyst efficiency suffers. The most typical solvent:ethylene ratio (weight basis) is in the range of from 5:1 to 10:1.

The ethylene/α-olefin interpolymer may be prepared by any suitable process, such as a slurry polymerization process, using the catalysts as described above as supported in an inert support, such as silica. As a practical limitation, slurry polymerizations take place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. Likewise, the α-olefin monomer or a mixture of different α-olefin monomers may be used in whole or part as the diluent. Most preferably, the diluent comprises in at least major part the α-olefin monomer or monomers to be polymerized.

The term "conductive carbon" as used herein refers to electronically-conductive grades of carbon black, carbon fibers, and graphite. Suitable carbon fibers include agglomerates of fibers having an aspect ratio of at least five and a diameter in the range of 3.5 to 70 nm as described, for example, in WO 91/03057. Suitable graphite particles have a size in the range of 1 to 30 μm and a surface area in the range of 5 to 100 $m^2/g$. Examples of suitable carbon blacks include particles of carbon having an average primary particle diameter of less than 125 nm, more preferably less than 60 nm. The carbon black is preferably utilized as an aggregate or agglomerate of primary particles, the aggregate or agglomerate typically having a size of 5 to 10 times the primary particle size. Larger agglomerates, beads, or pellets of carbon particles may also be utilized as a starting material in the preparation of the composition, so long as they disperse during the preparation or processing of the composition sufficiently to reach an average size in the cured composition of less than 10 microns, more preferably less than 5 microns, and most preferably less than 1.25 microns. The carbon black preferably has a nitrogen surface area of at least 125 $m^2/g$, more preferably at least 200 $m^2/g$. The nitrogen surface area of the carbon black may be determined using ASTM Method No. D 3037-93. The dibutyl phthalate absorption of the carbon is preferably at least 75 cc/100 g, more preferably at least 100 cc/100 g, and may be measured according to ASTM Method No. D 2414-93. The carbon black is preferably employed in an amount, based on the weight of the composition, of at least about 0.1 percent, more preferably at least 0.25 percent, but preferably no greater than 20 percent, more preferably no greater than 12 percent, but is preferably no greater than 11 percent. If desired, mixtures of conductive carbons with different properties may also be used. In one embodiment, carbon blacks having a nitrogen surface area of less than 500 $m^2/g$ and a dibutyl phthalate absorption of less than 250 cc/100 g may be used in combination with carbon blacks having higher nitrogen surface areas and dibutyl phthalate absorption numbers.

Fillers which may be present in the composition include talc or graphite, calcium carbonate, clay, feldspar, nepheline, silica or glass, fumed silica, alumina, magnesium oxide, zinc oxide, barium sulfate, aluminum silicate, calcium silicate, titanium dioxide, titanates, glass microspheres or chalk. Of these fillers, talc, calcium carbonate, silica/glass, alumina and titanium dioxide are preferred and talc is most preferred. Ignition-resistance fillers which can be used in the composition include antimony oxide, decabromobiphenyl oxide, alumina trihydrate, magnesium hydroxide, borates, and halogenated compounds. Of these ignition-resistant fillers, alumina trihydrate and magnesium hydroxide are preferred. Other miscellaneous fillers include wood fibers/flours/chips, cotton, starch, glass fibers, synthetic fibers (e.g., polyolefin fibers), and carbon fibers. Preferably, the compositions of the invention contain fillers in an amount, based on the weight of the composition, of at least 0.1 percent. The addition of such non-conductive fillers have been discovered to increase the conductivity of the composition. Other additives such as antioxidants (e.g., IRGANOX® 1010), phosphites (e.g., IRGAFOS® 168), cling additions (e.g., PIB), antiblock additives, pigments, colorants, and the like can also be included in the composition.

The process of the invention may be carried out, and may be prepared by any convenient method, including dry blending the individual components and subsequently melt mixing, either directly in a single- or twin-screw extruder used to make pellets of the composition or the finished article (e.g., the automotive part), or by pre-melt mixing in a separate mixer (e.g., a Banbury mixer). However, in the process of the invention, the major portion of the conductive carbon is pre-mixed with the polymer in which it will be dispersed in the composition prepared by the process. Pre-melt mixing of the components may be carried out, for example, by wet-blending or dry-blending pellets or powders of the polymers and the conductive carbon, which may then optionally be mixed further in a roll kneader at elevated temperatures. In another embodiment, solutions of the polymer(s) may be blended with the conductive carbon in a liquid medium. Dry blends of the compositions can also be directly injection molded without pre-melt mixing. In the composition of the invention, less than 40 percent of the conductive carbon is dispersed in the most crystalline polymer component. More preferably, less than 25 percent is dispersed within such polymer, more preferably less than 10 percent, and most preferably less than 5 percent. The amount of conductive carbon which becomes dispersed in the more crystalline components is influenced by several factors, including the relative surface free energies of the components, the relative viscosities of the polymers present; and the mixing configuration and duration. The process for preparing the composition and the relative amounts of components may also affect the low temperature impact strength (ASTM Dynatup Dart Impact Test (−29° C.), No. D3763-93) of the composition, and the composition and the method for its preparation are preferably optimized experimentally to achieve the best combination of conductivity and physical properties, depending on the structural application for which the composition is to be used.

To facilitate the dispersion of the conductive carbon in the less crystalline components, the conductive carbon may be preblended with one such component, as in the process of the invention, before being combined with more crystalline components. In one preferred embodiment, the conductive carbon is added to the reaction mixture for the process for preparing the less crystalline polymer (so long as such addition does not significantly interfere in the process for preparing the polymer), in order to avoid a separate preblending step. However, preblending is not required if the components of the composition are selected so that the migration of most of the conductive carbon to a less crystalline component during the process for the preparation of the composition is favored. The following examples illustrate combinations of carbon blacks, thermoplastic polymers, and processing conditions which favor the dispersion of carbon black in the less crystalline component.

There are many types of molding operations which can be used to form useful fabricated articles or parts from the TPO formulations disclosed herein, including various injection molding processes (e.g., as described in *Modern Plastics Encyclopedia*/89, Mid October 1988 Issue, Vol. 65, No. 11, pp. 264–268, "Introduction to Injection Molding" and on pp. 270–271, "Injection Molding Thermoplastics", the disclosures of which are incorporated herein by reference) and blow molding processes (e.g., as described in *Modern Plastics Encyclopedia*/89, Mid October 1988 Issue, Vol. 65, No. 11, pp. 217–218, "Extrusion-Blow Molding", the disclosure of which is incorporated herein by reference) and profile extrusion. Some of the fabricated articles include automotive bumpers, fascia, wheel covers and grilles, as well as other household and personal articles, including, for example, freezer containers.

The composition preferably has a conductivity of at least about $10^{-9}$ S/cm, and more preferably at least $10^{-7}$ S/cm, but is preferably no greater than 1 S/cm. The term "conductivity" as used herein refers to the internal conductivity of the composition in solid form, as may be measured according to the procedure set forth in the following examples. However, the surface conductivity of the composition may be different from its internal conductivity, and may be less than $10^{-12}$ S/cm.

Once fabricated, the electronically-conductive article can be painted or coated on at least one of its surfaces using any suitable electromotive coating process. The term "electromotive coating process" as used herein refers to any coating process wherein an electrical potential exists between the substrate being coated and the coating material. Examples of electromotive coating processes include electrostatic coating of liquids or powders, electrodeposition ("E-Coat") processes, electromotive vapor deposition, and electroplating processes. The article may be painted or coated with any suitable water-based or organic-based composition (or water/organic mixture), including conductive primer compositions which further enhance the electronic conductivity of the article, or with a solventless composition by a powder coating or vapor deposition method.

Unless indicated otherwise, the following terms and testing procedures referred to herein are defined as follows:

Density is measured in accordance with ASTM D-792. The samples are annealed at ambient conditions for 24 hours before the measurement is taken.

Molecular weight is determined using gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 mL/min and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in *Journal of Polymer Science, Polymer Letters*, Vol. 6, p. 621 (1968), incorporated herein by reference) to derive the following equation:

$$M_{polyethylene} = a*(M_{polystyrene})^b.$$

In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the ith fraction eluting from the GPC column.

The following examples illustrate the invention, but are not intended to limit it in any way. Unless otherwise stated, all parts and percentages are by weight.

EXAMPLES 1 TO 4

Examples 1 to 4 are prepared on a Haake torque rheometer using a Rheomix 3000 mixing bowl with roller blades. In Examples 1 to 3, a 70/30 weight percent mixture of polypropylene (PROFAX™ 6323 from Montell Polyolefins) (Component (B)) and elastomer (ENGAGE™ 8180 from DuPont Dow Elastomers) (Component (A)) are added to the mixer at 75 rpm and mixed at 185° C. for about 4 minutes until blended. The carbon black is then added and the composition is mixed for an additional 4 minutes. A portion of the mixture is then removed from the mixer, ground, and injection molded into tensile bar and 2 inch diameter disk test specimens.

Example 4 is prepared using a melt blended mixture of 17.5 weight percent carbon in ENGAGE™ 8180 elastomer (hereafter, a "masterbatch"). This material was then removed from the mixer, ground, and used to prepare a letdown in the mixer by adding polypropylene and elastomer as necessary to achieve a final composition of 6 weight percent carbon in a 70/30 propylene/elastomer blend.

Core conductivity of the compositions is measured by freeze fracturing the middle of a tensile bar sample in liquid nitrogen to form a sample 12.7 mm×1.9 mm×approximately 20 mm. The two fractured surfaces are painted with a conductive primer and the resistance is measured from one edge to the opposite edge of the sample. The conductivity is calculated by dividing the distance between the two painted surfaces (about 20 mm but measured for each sample) by the area of the painted surface and by the resistance.

Low temperature impact strength is measured according to ASTM-D3763-93 on a Dynatup model 8000 drop tower. The drop height is 12 inches and the drop weight is 138.5 pounds. The tup diameter is 0.625 inches and the unsupported sample area is 1.25 inches. Samples are tested at −29° C., and the data is reported in Table 1. VULCAN™ carbon blacks referred to in these examples are available from Cabot Corporation, Waltham, Mass. PRINTE™ carbon blacks are available from Degussa Corporation, Ridgefield Park, N.J.

TABLE 1

| Ex. | Carbon type | Load level (wt %) | Method of compounding | Core conductivity value (S/cm) | Low temp. impact strength (ft-lb) | Weight ratio of (B)/(A) |
|---|---|---|---|---|---|---|
| 1 | Vulcan ™ XC-72 beads (Cabot) | 11 | direct addition to (A)/(B) mixture | $1.6 \times 10^{-6}$ | 45.6 | 70/30 |
| 2 | Vulcan ™ XC-72R powder | 10 | direct addition to (A)/(B) mixture | $5.2 \times 10^{-6}$ | 47.1 | 70/30 |
| 3 | Printex ™ XE-2 beads (Degussa) | 6 | direct addition to (A)/(B) mixture | $4.2 \times 10^{-5}$ | 31.8 | 70/30 |
| 4 | Printex ™ XE-2 beads (Degussa) | 6 | letdown from 17.5% preblend in Engage ™ | $1.7 \times 10^{-6}$ | 51.4 | 70/30 |

EXAMPLES 5 TO 7

In Example 5, elastomer pellets along with carbon black are fed into the hopper of a Werner Pfleiderer twin-screw extruder (Model ZSK-30) at 190° C. to prepare a masterbatch consisting of 36% VULCAN™ XC-72 (Cabot Corporation) in elastomer (ENGAGE™ 8180). The extruded strand is cooled in a water bath and chopped into pellets. This masterbatch is letdown in a Haake laboratory mixer Rheomix 3000 by adding polypropylene and additional elastomer as necessary to obtain a 15 weight percent carbon black loading in a 70/30 TPO of PROFAX™ 6323/ENGAGE™ 8180. Samples are injection molded and tested as described for Example 1.

Example 6 is prepared in the same way as Example 5 except the final composition of TPO is 60/32/8 of PROFAX™ 6231/ENGAGE™ 8180/HDPE 32160C. HDPE 32160C is a high density ethylene homopolymer available from The Dow Chemical Company.

Example 7 is prepared by addition of carbon black directly into the melt during extrusion in a ZSK-30 twin screw. A pellet mixture of 63/29.5/7.5 weight percent of polypropylene (PROFAX™ 6231)/elastomer (ENGAGE™ 8180)/HDPE (Dow 32160C) is added to the feed hopper and mixed in the extruder at 170° C. by a set of kneading blocks. Carbon black is then added through a vent port into the melt and dispersed by passing through additional kneading block sections. The strand is cooled in a water bath and chopped into pellets which are injection molded into test specimens. Conductivity and impact strength tests are performed as described in Example 1, and the data is reported in Table 2.

TABLE 2

| Ex. | Carbon type | Load level (wt %) | Method of compounding | Core conductivity value (S/cm) | Low temp. impact strength (ft-lb) | TPO blend |
|---|---|---|---|---|---|---|
| 5 | Vulcan ™ XC-72 beads | 15 | letdown of 36% MB in EG-Engage ™ | $3.4 \times 10^{-6}$ | 40.2 | 70/30 |
| 6 | Vulcan ™ XC-72 beads | 15 | Letdown of 36% MB in Engage ™ | $1.8 \times 10^{-6}$ | 46.4 | 60/32/8 |
| 7 | Printex ™ XE-2 beads | 4.8 | direct addition to TPO | $3.7 \times 10^{-6}$ | 40.8 | 63/29.5/7.5 |

EXAMPLES 8 TO 13

Compositions are prepared using a Haake laboratory mixer as described in Example 1 from the components shown in Table 3. NORDEL™ 2722 and 2470 are EPDM rubbers available from DuPont Dow Elastomers.

TABLE 3

| Ex. | TPO formulation | Carbon loading and type | Core conductivity (S/cm) | Low temperature impact strength (ft-lb) |
|---|---|---|---|---|
| 8 | 70/30 Profax ™ 6323/ Engage ™ 8180 | 11% Vulcan ™ XC-72 | $1.6 \times 10^{-6}$ | 45.6 |
| 9 | 63/29.5/7.5 Profax ™ 6231 Engage ™ 8180 HDPE 32160C | 11% Vulcan ™ XC-72 | $4.2 \times 10^{-6}$ | 44.9 |
| 10 | 60/40 Profax ™ 6231/ Engage ™ 8180 | 6% Printex ™ XE-2 | $4.2 \times 10^{-6}$ | 49.6 |
| 11 | 65/35 Profax ™ 6231/ Engage ™ 8180 | 6% Printex ™ XE-2 | $22.0 \times 10^{-6}$ | 49.6 |
| 12 | 70/30 Profax ™ 6231/ Nordel ™ 2522 | 6% Printex ™ XE-2 | $68.0 \times 10^{-6}$ | 34.9 |
| 13 | 55/45 Profax ™ 6231/ Nordel ™ 2470 | 6% Printex ™ XE-2 | $1.4 \times 10^{-6}$ | 39.8 |

Note: All of the above samples were mixed in a Haake laboratory mixer.

EXAMPLES 14 AND 15

Examples 14 and 15 are prepared using a Haake torque rheometer mixer as described in Example 1. A 70/30 blend of polypropylene (PROFAX™ 6323, Montell) and elastomer (ENGAGE™ 8180, DuPont Dow Elastomers) is used in these examples. In Example 15, the talc (Vantalc 6H, R.T. Vanderbuilt Co., Norwalk, Conn.) is added with the carbon black to the molten polymer blend.

TABLE 4

| Ex. | Carbon type | Carbon loading level (wt %) | Talc loading level (wt %) | Core conductivity value (S/cm) | Low temp. impact strength (ft-lb) | TPO blend |
|---|---|---|---|---|---|---|
| 14 | Printex ™ XE-2 (Degussa) | 5 | 0 | less than $10^{-8}$ | 43.0 | 70/30 |
| 15 | Printex ™ XE-2 | 5 | 2 | $3.5 \times 10^{-5}$ | 26.0 | 70/30 |

What is claimed is:

1. A mixture of polymers and electronically-conductive carbon, comprising:
   (I) 15 to 49 percent by weight of an amorphous or semi-crystalline thermoplastic polymer or blend of polymers having a degree of crystallinity of less than 20 percent;
   (II) 50.9 to 84.4 percent by weight of a semi-crystalline thermoplastic polymer or miscible blend of polymers, immiscible with component (I) and having a degree of crystallinity of greater than 30 percent; and
   (III) 0.1 to 12 percent by weight of electronically-conductive carbon, which is present in an amount sufficient to provide a conductivity of at least $10^{-12}$ S/cm;
   wherein at least 75 percent of component (III) is dispersed in component (I).

2. The mixture of claim 1 wherein at least 90 percent of component (III) is dispersed in component (I).

3. The mixture of claim 1 wherein at least 95 percent of component (III) is dispersed in component (I).

4. The mixture of claim 1 wherein component (I) is an ethylene/$C_{3-20}$ α-olefin/diene terpolymer.

5. The mixture of claim 4 wherein the diene is a $C_{6-15}$ non-conjugated diene.

6. The mixture of claim 4 wherein the non-conjugated diene is a cycloalkylidene norbornene.

7. The mixture of claim 1 wherein component (I) is a homogeneous linear or substantially linear interpolymer of ethylene and at least one $C_{3-20}$ α-olefin.

8. The mixture of claim 7 wherein the $C_{3-20}$ α-olefin is 1-butene, 1-hexene, 4-methyl-1-pentene, 1-heptene, 1-octene, or a mixture thereof.

9. The mixture of claim 8 wherein component (I) is a homogeneous linear interpolymer prepared using a single-site metallocene catalyst.

10. The mixture of claim 1 wherein the conductive carbon is present in an amount sufficient to provide a conductivity of at least $10^{-9}$ S/cm.

11. The mixture of claim 4 wherein the conductive carbon is present in an amount sufficient to provide a conductivity of at least $10^{-7}$ S/cm.

12. The mixture of claim 11 wherein the conductive carbon is present in an amount sufficient to provide a conductivity of no greater than 1 S/cm.

13. The mixture of claim 5 wherein the composition additionally comprises at least 0.25 percent by weight of a filler.

14. The mixture of claim 13 wherein the filler is selected from talc, graphite, calcium carbonate, clay, feldspar, nepheline, silica, glass, fumed silica, alumina, magnesium oxide, zinc oxide, barium sulfate, aluminum silicate, calcium silicate, titanium dioxide, titanates, glass microspheres, and chalk.

15. The mixture of claim 1 wherein the conductive carbon is present in an amount, based on the weight of the composition, of less than 11 percent.

16. The mixture of claim 1 wherein component (III) contains at least two different carbon blacks, a first carbon black having a nitrogen surface area of less than 500 m$^2$/g and a dibutyl phthalate absorption of less than 250 cc/100 g, and a second carbon black having a higher nitrogen surface area and dibutyl phthalate absorption number.

17. The mixture of claim 1 wherein component (II) comprises at least two immiscible polymers.

18. A mixture of polymers and electronically-conductive carbon, comprising:
  (I) 15 to 49 percent by weight of an amorphous or semi-crystalline interpolymer of ethylene and at least one α-olefin prepared using a constrained geometry catalyst and having a degree of crystallinity of less than 20 percent;
  (II) 50.9 to 84.9 percent by weight of a semi-crystalline thermoplastic polymer or miscible blend of polymers, immiscible with component (I) and having a degree of crystallinity of greater than 30 percent; and
  (III) 0.1 to 12 percent by weight of electronically-conductive carbon, which is present in an amount sufficient to provide a composition conductivity of at least $10^{-12}$ S/cm;
wherein at least 75 percent of component (III) is dispersed in component (I).

19. The mixture of claim 18 wherein at least 90 percent of component (III) is dispersed in component (I).

20. The mixture of claim 18 wherein at least 95 percent of component (III) is dispersed in component (I).

21. The mixture of claim 18 wherein the $C_{3-20}$ α-olefin is 1-butene, 1-hexene, 4-methyl-1-pentene, 1-heptene, 1-octene, or a mixture thereof.

22. The mixture of claim 21 wherein the α-olefin is 1-octene.

23. The mixture of claim 18 wherein the conductive carbon is present in an amount sufficient to provide a conductivity of at least $10^{-9}$ S/cm.

24. The mixture of claim 18 wherein the conductive carbon is present in an amount sufficient to provide a conductivity of at least $10^{-7}$ S/cm.

25. The mixture of claim 18 wherein the conductive carbon is present in an amount sufficient to provide a conductivity of no greater than 1 S/cm.

26. The mixture of claim 18 wherein the composition additionally comprises at least 0.25 percent by weight of a filler.

27. The mixture of claim 26 wherein the filler is selected from talc, graphite, calcium carbonate, clay, feldspar, nepheline, silica, glass, fumed silica, alumina, magnesium oxide, zinc oxide, barium sulfate, aluminum silicate, calcium silicate, titanium dioxide, titanates, glass microspheres, and chalk.

28. The mixture of claim 18 wherein the conductive carbon is present in an amount, based on the weight of the composition, of less than 11 percent.

29. The mixture of claim 18 wherein component (III) contains at least two different carbon blacks, a first carbon black having a nitrogen surface area of less than 500 m$^2$/g and a dibutyl phthalate absorption of less than 250 cc/100 g, and a second carbon black having a higher nitrogen surface area and dibutyl phthalate absorption number.

30. The mixture of claim 18 wherein component (II) comprises at least two immiscible polymers.

31. A mixture of polymers and electronically-conductive carbon, comprising:
  (I) 15 to 49 percent by weight of an amorphous or semi-crystalline interpolymer of ethylene and at least one α-olefin prepared using a constrained geometry catalyst and having a degree of crystallinity of less than 20 percent;
  (II) 50.9 to 84.9 percent by weight of a polypropylene having a degree of crystallinity of greater than 30 percent; and
  (III) 0.1 to 12 percent by weight of electronically-conductive carbon, which is present in an amount sufficient to provide a composition conductivity of at least $10^{-12}$ S/cm;
wherein at least 75 percent of component (III) is dispersed in component (I).

32. The mixture of claim 31 wherein at least 90 percent of component (III) is dispersed in component (I).

33. The mixture of claim 31 wherein at least 95 percent of component (III) is dispersed in component (I).

34. The mixture of claim 31 wherein the $C_{3-20}$ α-olefin is 1-butene, 1-hexene, 4-methyl-1-pentene, 1-heptene, 1-octene, or a mixture thereof.

35. The mixture of claim 31 wherein the α-olefin is 1-octene.

36. The mixture of claim 31 wherein the conductive carbon is present in an amount sufficient to provide a conductivity of at least $10^{-9}$ S/cm.

37. The mixture of claim 31 wherein the conductive carbon is present in an amount sufficient to provide a conductivity of at least $10^{-7}$ S/cm.

38. The mixture of claim 31 wherein the conductive carbon is present in an amount sufficient to provide a conductivity of no greater than 1 S/cm.

39. The mixture of claim 31 wherein the composition additionally comprises at least 0.25 percent by weight of a filler.

40. The mixture of claim 39 wherein the filler is selected from talc, graphite, calcium carbonate, clay, feldspar, nepheline, silica, glass, fumed silica, alumina, magnesium oxide, zinc oxide, barium sulfate, aluminum silicate, calcium silicate, titanium dioxide, titanates, glass microspheres, and chalk.

41. The mixture of claim 31 wherein the conductive carbon is present in an amount, based on the weight of the composition, of less than 11 percent.

42. The mixture of claim 31 wherein component (III) contains at least two different carbon blacks, a first carbon black having a nitrogen surface area of less than 500 m$^2$/g and a dibutyl phthalate absorption of less than 250 cc/100 g, and a second carbon black having a higher nitrogen surface area and dibutyl phthalate absorption number.

43. The mixture of claim 31 which additionally comprises at least one polymer which is imiscible with components (I) and (II).

* * * * *

UNITED STATES PATENT AND TRADEMARK OFFICE
CERTIFICATE OF CORRECTION

PATENT NO : 5,844,037

DATED : December 1, 1998

INVENTOR(S) : Richard A. Lundgard; Susan J. Babinec; Robert D. Mussell; Ashish Sen It is certified that error appears in the above-identified patent and that said Letters Patent are hereby corrected as shown below:

Title page, column 2, line 25, OTHER PUBLICATIONS, following (JP 08283421-Oct. 29, 1996). Insert
-- Gubbels, F. et al., "Selective Localization of Carbon Black in Immiscible Polymer Blends: A Useful Tool to Design Electrical Conductive Composites," Macromolecules, Vol. 27, pp. 1972-1974 (1994) --

Signed and Sealed this

Third Day of April, 2001

*Attest:*

NICHOLAS P. GODICI

*Attesting Officer*     Acting Director of the United States Patent and Trademark Office